(12) United States Patent
Zimmer et al.

(10) Patent No.: US 7,987,349 B2
(45) Date of Patent: Jul. 26, 2011

(54) ENCRYPTION ACCELERATION

(75) Inventors: Vincent J. Zimmer, Federal Way, WA (US); Michael Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 1061 days.

(21) Appl. No.: 11/771,671

(22) Filed: Jun. 29, 2007

(65) Prior Publication Data

US 2009/0006830 A1    Jan. 1, 2009

(51) Int. Cl.
G06F 9/445 (2006.01)
G06F 15/177 (2006.01)
G06F 9/24 (2006.01)
G06F 13/10 (2006.01)

(52) U.S. Cl. .......... 713/1; 713/2; 713/100; 713/189; 713/190; 710/8; 710/10; 710/13

(58) Field of Classification Search ............ 713/1, 2, 713/100, 189–190; 710/8, 10, 13
See application file for complete search history.

(56) References Cited

U.S. PATENT DOCUMENTS

| | | | |
|---|---|---|---|
| 7,565,553 B2* | 7/2009 | Hunter et al. | 713/192 |
| 2003/0093684 A1* | 5/2003 | Kaiserswerth et al. | 713/193 |
| 2005/0111664 A1* | 5/2005 | Ritz et al. | 380/255 |
| 2006/0174109 A1* | 8/2006 | Flynn | 713/164 |
| 2007/0239996 A1* | 10/2007 | Cromer et al. | 713/193 |
| 2008/0130893 A1* | 6/2008 | Ibrahim et al. | 380/277 |

* cited by examiner

*Primary Examiner* — Thomas Lee
*Assistant Examiner* — Fahmida Rahman
(74) *Attorney, Agent, or Firm* — Schwegman, Lundberg & Woessner, P.A.

(57) ABSTRACT

The subject mater herein relates to data processing and, more particularly, to encryption acceleration. Various embodiments herein provide devices and systems including a standardized encryption application programming interface embedded in firmware to perform encryption services. Some such embodiments move encryption operations away from operating system processes into firmware. As a result, encryption operations are generally accelerated.

5 Claims, 3 Drawing Sheets

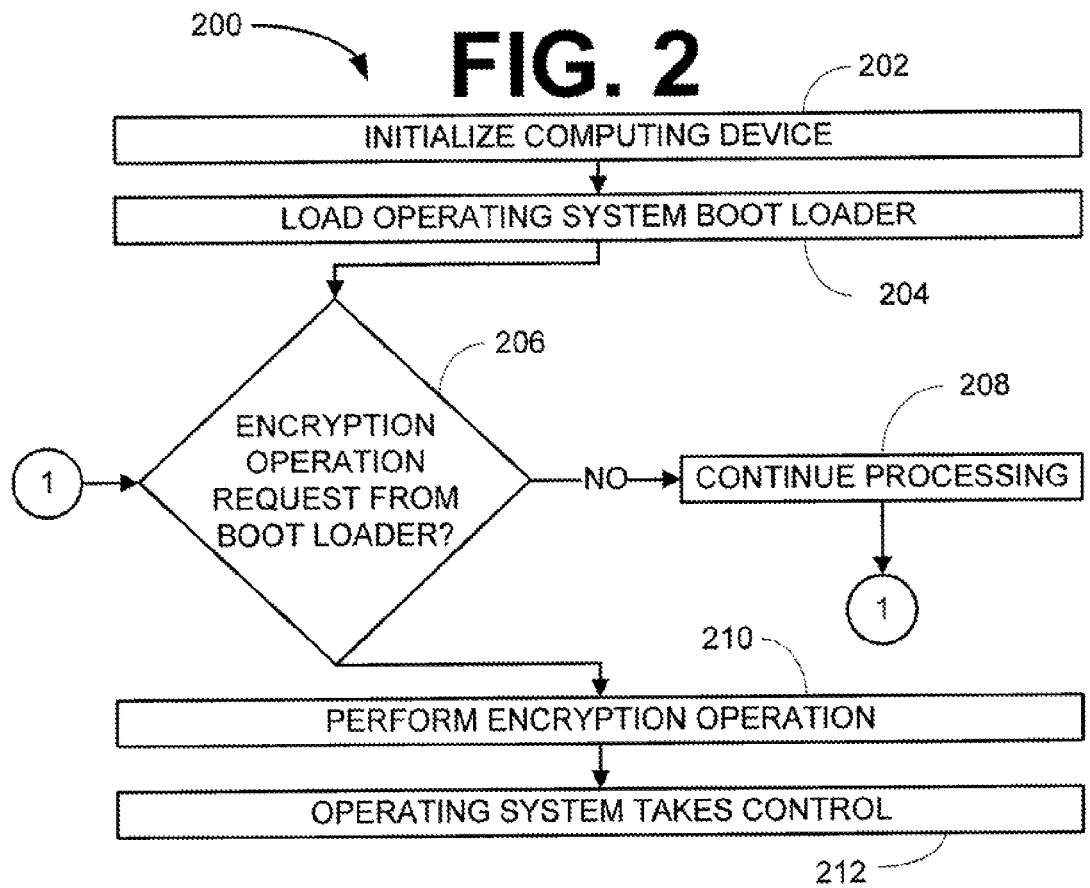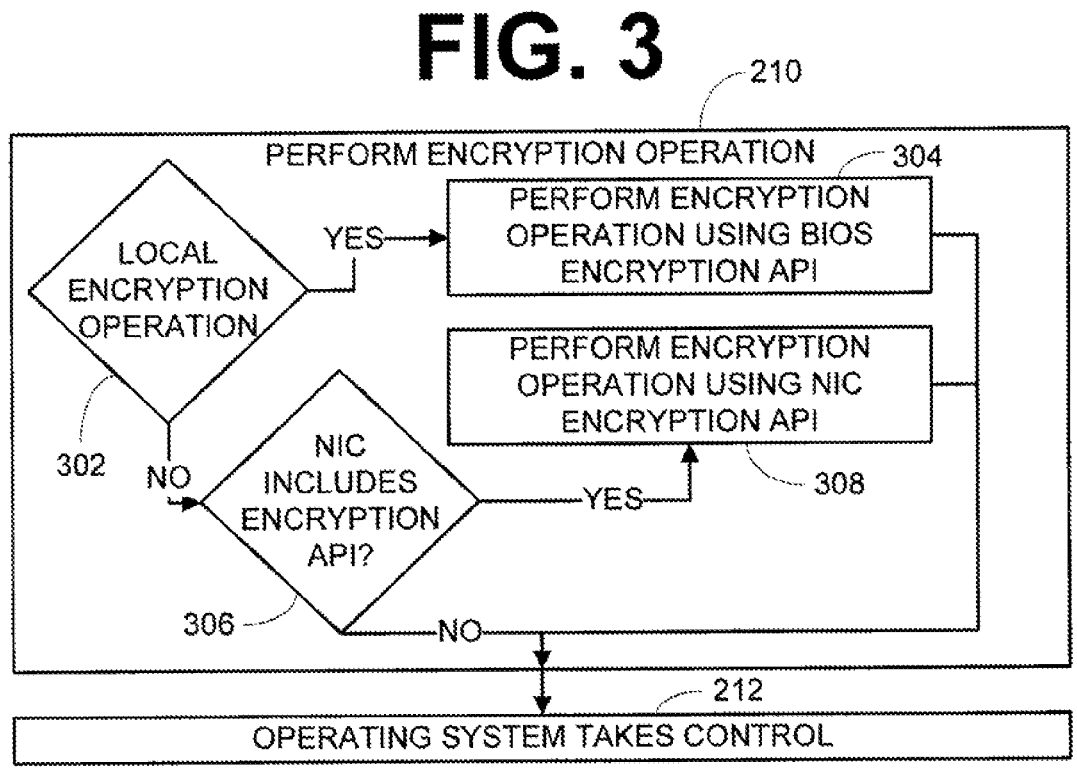

ENCRYPTION ACCELERATION

TECHNICAL FIELD

The subject mater herein relates to data processing and, more particularly, to encryption acceleration.

BACKGROUND INFORMATION

As data security becomes more an more important to individuals and enterprises, encryption of data, both stored and transient data, has become prevalent. However, software operations to encrypt and decrypt data are extremely resource intensive. This commonly slows performance of devices performing the encryption operations. Slowed performance is especially visible in instances where data stored on hard disks is encrypted, such as in encrypted volumes. In such instances, as operating systems are loaded, it is not uncommon for at least some portions of operating system instructions to be decrypted prior to execution. However, the operating system needs to be decrypted in the pre-boot environment which is very resource-poor. As a result, the decryption of the operating system extends boot time considerably. With Logical-Block-Addressing ("LBA") based encryption utilized in full-volume encryption, coupled with ever-larger disks, such as two terabyte disks today and ten terabyte disks expected by 2010, LBA based encryption and other encryption technologies create usability concerns from long install operations, long machine reboots, and the like.

Further, as network bandwidth availability increases, more and more data in larger and larger files is being sent over networks. At the same time, encryption of data transmitted over networks is often necessary. As a result, data transmission latency is increasing due to software encryption and decryption operations performed on the data.

BRIEF DESCRIPTION OF THE DRAWINGS

FIG. 2 is a block flow diagram of a method according to an example embodiment.

FIG. 3 is a block flow diagram of a method according to an example embodiment.

DETAILED DESCRIPTION

Figure 1:
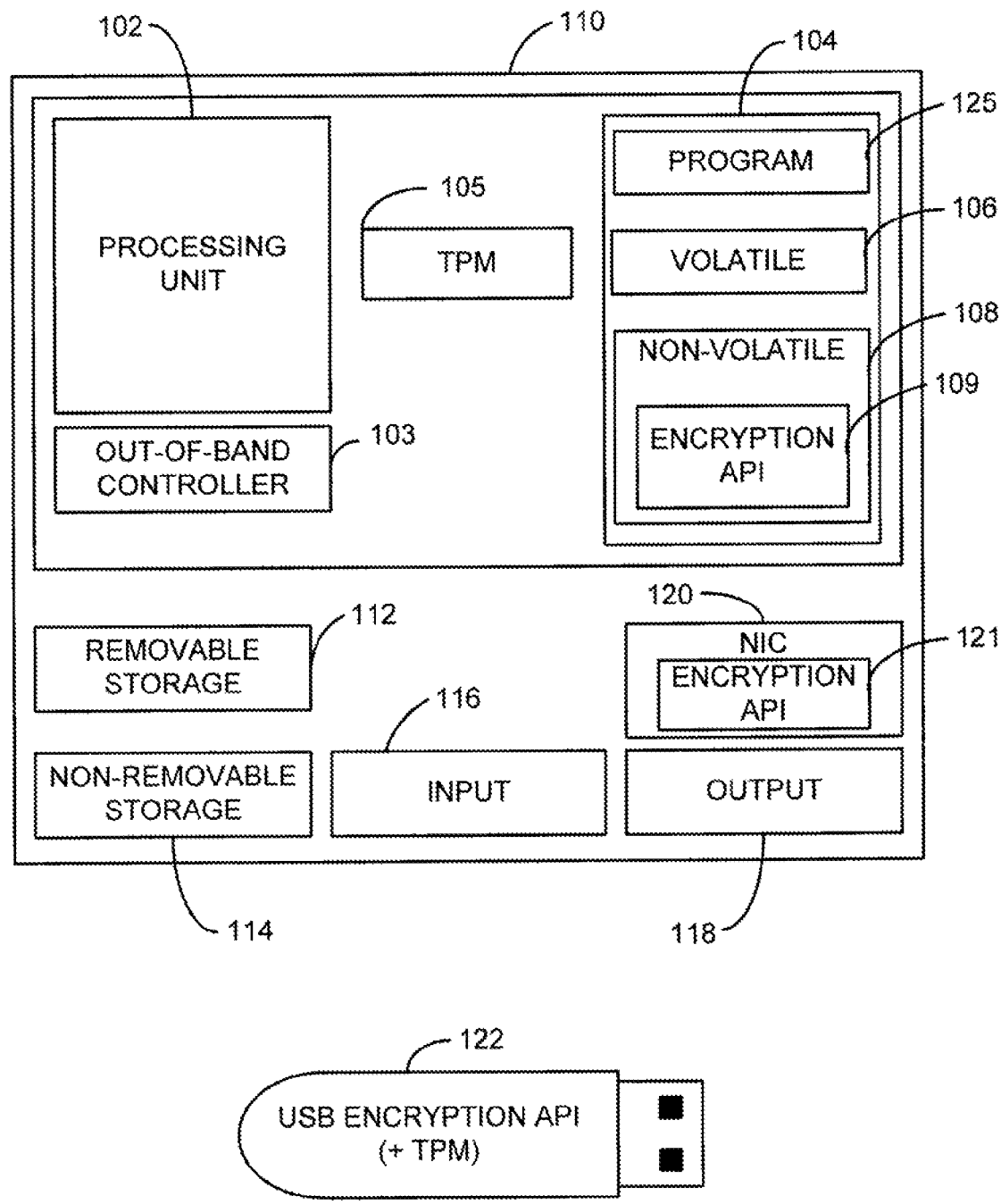
FIG. 1 is a block diagram of a computing device according to an example embodiment.

Various embodiments described herein provide encryption service application programming interfaces ("API") that provide an encrypt service and a decrypt service. These interfaces may be embedded in firmware of any number of devices. In typical embodiments, each device including an encryption service API provides at least one or both of encrypt service and a decrypt service through an interface that is standardized across devices. However, although the API from one device to the next may be utilized in a standardized manner, the API of each device is implemented in firmware of the device in a manner that is specific to the resources within the specific device. Some such embodiments leverage industry-standard capabilities for access to resources, such as hard disks, via the Unified Extensible Firmware Interface ("UEFI"). Some such API's abstract capabilities of UEFI based systems, such as pre-operating system multi-processor interfaces and abstractions of other platform hardware. These and other embodiments are described in greater detail below.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a block diagram of a computing device according to an example embodiment. In one embodiment, multiple such computer devices are utilized in a distributed network to implement multiple components in a transaction based environment. An object oriented architecture may be used to implement such functions and communicate between the multiple systems and components. One example computing device in the form of a computer 110, may include a processing unit 102, memory 104, removable storage 112, and non-removable storage 114. Memory 104 may include volatile memory 106 and non-volatile memory 108. Computer 110 may include—or have access to a computing environment that includes—a variety of computer-readable media, such as volatile memory 106 and non-volatile memory 108, removable storage 112 and non-removable storage 114. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 110 may include or have access to a computing environment that includes input 116 coupled to one or more input devices, output 118 coupled to one or more output devices, and a network interface card 120. The computer may operate in a networked environment using the network interface card 120 to connect to one or more remote computers, such as database servers. The remote computer may include a personal computer (PC), server, router, network PC, a peer device or other common network node, or the like. The network interface card 120 may connected to one or more networks including one or more of a Local Area Network (LAN), a Wide Area Network (WAN), the Internet, or other networks.

Computer-readable instructions stored on a computer-readable medium are executable by the processing unit 102 of the computer 110. A hard drive, CD-ROM, ROM, and RAM are some examples of articles including a computer-readable medium. The memory may hold a program 125, such as an operating system to provide operation features to users, processes, and other elements and hardware.

The computer 110 may also include an out-of-band controller 103 that provides services on the computer 110 for various purposes. The computer 110, in some embodiments includes a trusted platform module ("TPM") 105 to hold encryption keys and other sensitive information depending on the embodiment.

In some embodiments, a Universal Serial Bus ("USB") device 122 may be coupled to the computer 110. The USB device 122 includes an encryption API and may also include a TPM. When coupled to the computer 110, the encryption API of the USB device registers with the operating system or BIOS and provides encryption service to one or more processes or devices of the computer. In some embodiments, the USB device 122 must be coupled to the computer 110 to allow the computer 110 to boot through utilization of one or more keys or passwords stored in the TPM.

The non-volatile memory 108 of the computer 104, such as a ROM, holds a BIOS that provides basic operation functions to the computer 110 and allows the computer 110 to boot. The non-volatile memory 108 also holds an encryption application programming interface ("API") 109. The encryption API 109 in some embodiments is part of the computer 110 BIOS and provides encryption services to encrypt and decrypt data for the BIOS aid other processes during boot of the computer 110. The encryption API 109 may also be utilized by processes of the operating system, such as an operating system loader during boot, and other processes of the operating system or other programs after the operating system is operational. In some embodiments, the encryption API 109 utilizes one or more encryption keys stored in the TPM 105 to perform encryption operations.

In these embodiments, and others, the encryption API 109 is part of the Unified Extensible Firmware Interface and is also present on one or more other devices, such as network interface card 120. The encryption API 121 of the network interface card 120, the encryption API 109 of the BIOS, and encryption API of one or more other devices provide a standardized API to perform encryption operations, such as encrypting and decrypting. In such embodiments, the standardized API provides services which may be called in a standard fashion across all devices including the API. However, each device including the standardized encryption API implements the API in a manner to leverage the resources available on the specific device. The encryption operations of the standardized encryption API generally abstract the capabilities for a particular cipher, such as the Advanced Encryption Standard—Galois Counter Mode, in various devices.

When implemented in the BIOS of a computer including multiple processors or multiple cores in a single processor, the encryption API may be implemented to parallelize encryption and decryption operations across multiple processors or cores. In a network interface card, the encryption API may be implemented to take advantage of one or more microprocessors available on the network interface card rather than sending data to a central processor to be encrypted or decrypted. The result is better utilization of device resources rather man over consumption of system resources. Further, encryption operations are moved out of operating system software and into hardware which, in many embodiments, is able to perform the operations more efficiently.

Various embodiments including the encryption API allows encryption operations to be removed from software and moved to firmware to accelerate these operations. The encryption operations of the standardized encryption API abstract the capabilities for a particular cipher, such as the Advanced Encryption Standard—Galois Counter Mode, in various devices.

Figure 4:
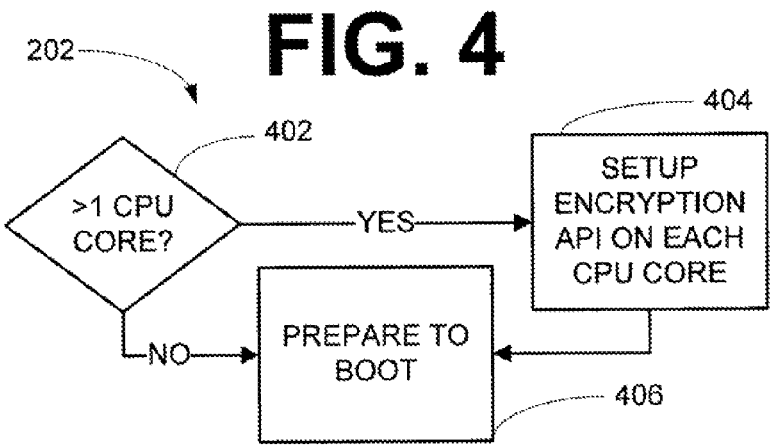
FIG. 4 is a block flow diagram of a method according to an example embodiment.

FIG. 2 is a block flow diagram of a method 200 according to an example embodiment. The example method 200 is a method of starting a computing device, such as a personal computer. The method 200 includes initializing the computing device 202, such as by starting a BIOS of the computing device. Initializing the computing device 202 may also include loading an encryption API into one or more processors to enable firmware encryption and decryption operations. FIG. 4 illustrates such an example.

The method 200 further includes loading An operating system boot loader 204. An operating system boot loader is a process that is executed on a computing device to load and start the various processes of an operating system. In embodiments where at least some of the data including the operating system is stored on the computing device in encrypted volumes, the boot loader is typically not stored in an encrypted fashion because traditionally, the operating system has performed the encryption operations. Thus, the boot loader cannot be decrypted using processes of the operating system that are not yet running. However, in some embodiments where initializing the computing device includes starting a bios including the standardized encryption API, the encryption services are available when the boot loader is loaded 204 by the BIOS. Thus, loading the operating system boot loader 204, may include decrypting the operating system boot loader.

After loading the operating system boot loader 204, the method 200 includes evaluating boot loader instructions to determine if an encryption operation request is received from the boot loader 206. If not, the boot loader continues processing 208. The method 200 then continues evaluating instructions until a request to perform an encrypt operation is received. When received, the encryption operation is performed 210 and control is returned to the operating system 212.

FIG. 3 is a block flow diagram of a method according to an example embodiment. The method of FIG. 3 is an embodiment of a method of performing an encryption operation 210 as mentioned above with regard to FIG. 2. Performing an encryption operation 210, in some embodiments, includes determining if the requested operation is a local encryption operation 302. If the requested operation is local, the encryption operation is performed using air encryption API of the computing device BIOS 304 and control is returned to the operating system 212. If the encryption operation is not local, such as an encryption operation to be performed on another device, this embodiment determines which device the encryption operation is to be performed on and if that device includes the encryption API. For example, if the encryption operation is to be performed on a network interface card, the method determines if the network interface card includes an encryption API 306. If the network interface card does not include the encryption API, the encryption operation is performed using one or more processes of the operating system. If the network interface card does include the encryption API, the data to be encrypted, such as data to be transmitted over a network, is sent to the network interface card which performs the encryption operation using its encryption API 308, transmits die encrypted data, and returns control to the operating system.

FIG. 4 is a block flow diagram of a method according to an example embodiment. The method of FIG. 4 is an embodiment of a method of initializing a computing device 202 as discussed above with regard to FIG. 2. Initializing a computing device may include starting a BIOS of a computing device to bring the various devices of the computing device online. This typically includes bringing one or more processors of the computing device online and loading the processors with firmware instructions for performing certain actions. In some such embodiments, the method includes determining if more than one processor core exists within a processor 402. If so, firmware instructions of the standardized encryption API specific for each processor core are loaded into each core to setup the encryption API 404. The method then prepares to boot 406 the operating system loader or other BIOS processes. If only one CPU core is present, the method loads the encryption API instructions into that single core then prepares to boot 406 the computing device.

Figure 5:
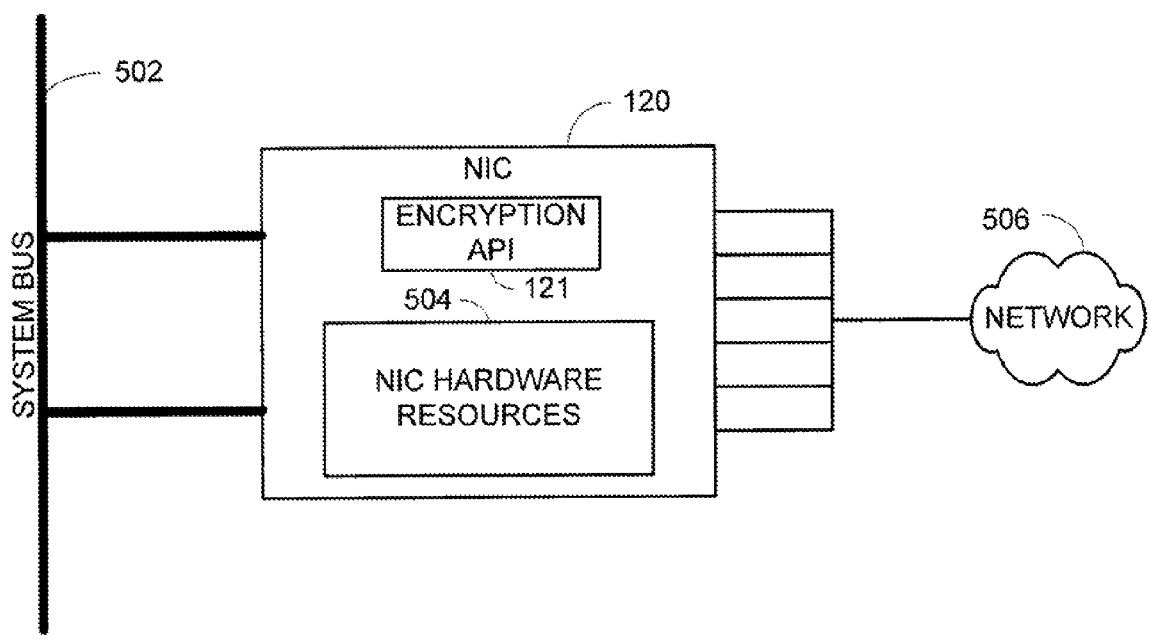
FIG. 5 is a block diagram of a portion of a computing device according to an example embodiment.

FIG. 5 is a block diagram of a portion of a computing device according to an example embodiment. The block diagram includes a network interface card 120 coupled to a computing device via a system bus 502. The network interface card also couples the computing device to a network 506. The network interface card 120 includes hardware resources 504 and an encryption API 121 as discussed above. The encryption API 121 is embedded in firmware of the network interface card 120 and provides a set of services to perform encryption operations. The encryption services may include encrypting and decrypting and are provided in a standardized manner across many hardware devices. However, the encryption API 121 of a specific device, although providing the same interface, includes code tailored to the hardware resources available on the specific device. For example, the network interface card 120 include hardware resources 504 that may be specific to network interface cards or even may be distinct to this particular network interface card 121. The encryption API 121 of the network interface card 121 allows processes to utilize the encryption API 121 in a device neutral fashion, but implements the services of the encryption API 121 in manner tailored specifically to the network interface card 120 hardware resources 504.

Although FIG. 5 illustrates the encryption API 121 embedded within firmware of a network interface card 120, other embodiments include other devices with an encryption API embedded therein. One example embodiment includes a hard drive with an encryption API embedded in firmware. In such embodiments, the hard drive may encrypt and decrypt ail or a portion of data stored on the hard drive using the encryption API. Some such embodiments may encrypt an decrypt the data using an encryption key stored in a TPM of a computing device, held in a USB device, or otherwise provided.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
 initializing a computing device;
 loading an operating system loader on to the computing device to begin initialization of the operating system;
 decrypting the operating system utilizing a firmware encryption service application programming interface ("API") of a peripheral device of the computing device as the operating system loader calls operating system processes to initialize the operating system, the decrypting of the operating system utilizing the peripheral device causing performance of encryption operations to be performed by one or more processors of the peripheral device; and
 wherein:
 initializing the computing device includes enabling universal serial bus ("USB") device utilization; and
 the firmware encryption service API is embedded as firmware in a USB device.

2. The method of claim 1, wherein the firmware encryption service API provides an encrypt service and a decrypt service.

3. The method of claim 1, wherein the firmware encryption service API provides encryption services utilizing an Advanced Encryption Standard encryption algorithm.

4. The method of claim 1, wherein the firmware encryption service API is part of a Unified Extensible Firmware Interface ("UEFI").

5. A non-transitory machine-readable storage medium, with instructions encoded thereon, which when processed by a suitably configured machine, cause the machine to perform the method of claim 1.

* * * * *